United States Patent [19]

Toyoda

[11] 4,043,677
[45] Aug. 23, 1977

[54] EXPOSURE METER
[75] Inventor: Kenji Toyoda, Kawasaki, Japan
[73] Assignee: Nippon Kogaku K.K., Tokyo, Japan
[21] Appl. No.: 639,176
[22] Filed: Dec. 9, 1975
[30] Foreign Application Priority Data
Dec. 28, 1974   Japan .................................. 50-1295
[51] Int. Cl.² .......................... G01J 1/42; G03B 17/20
[52] U.S. Cl. .................................. 356/227; 354/23 D; 354/53
[58] Field of Search ............. 356/227, 226; 354/23 D, 354/53

[56] References Cited
U.S. PATENT DOCUMENTS
3,883,252   5/1975   Ando ..................................... 356/226

FOREIGN PATENT DOCUMENTS
2,227,534   12/1972   Germany .............................. 356/227

Primary Examiner—John K. Corbin
Assistant Examiner—Stewart Levy
Attorney, Agent, or Firm—Fitzpatrick, Cella, Harper & Scinto

[57] ABSTRACT

An exposure meter includes a plurality of indicating elements, such as illuminating diodes which are turned on by the output of a photometry device and the diodes are repeatedly turned on and off by the output signal from a switch. This turn on and turn off of the diodes can be reversely effected. By so doing, a preset shutter speed or stop value is indicated in the finder and pointer-follow function of the exposure can be achieved using the minimum number of diodes.

14 Claims, 3 Drawing Figures

EXPOSURE METER

BACKGROUND OF THE INVENTION

1. Field of the Invention

This invention relates to an exposure meter for cameras.

2. Description of the Prior Art

An exposure meter having the ability to display in a finder, a preset stop value or a shutter speed and employing a so-called point-follower, is known. In this construction, a pointer for an ammeter indicates, with the aid of an output from a photometering circuit, a shutter speed or a stop value which is a proper exposure value corresponding to the brightness of an external field, the sensitivity of the film etc., and a movable pointer to be moved in interlocking relationship with a stop ring of a camera lens or shutter dial are provided on the same scale plate.

It has also been known to provide a plurality of indicating elements, such as illuminating diodes instead of the ammeter, for an exposure meter, and in accordance with an output of a photometering circuit, one or two of the illuminating elements are turned on so as to indicate the state of photometry.

The two types of exposure meter mentioned above indicate in a finder a present stop value or shutter speed with a pointer-follow system using the indicating elements. Thus:

1. An exposure meter in which a plurality of indicating elements are arranged in a row facing the scale plate in the finder, some of the elements being selectively turned on in accordance with the output of the photometering circuit to indicate a stop value or shutter speed which represents a proper exposure, and in the vicinity thereof a pointer is provided which is movable in interlocking relationship with a stop ring of a lens or shutter dial of the camera; and 2. An exposure meter in which a plurality of indicating elements are arranged in two rows facing the scale plate in the finder, one row of which will be selectively turned on in accordance with the output of the photometering circuit so as to indicate a stop value or shutter speed which represents a proper exposure value, and the other row will be selectively turned on in interlocking relationship with the stop ring of the lens or shutter dial of the camera.

So far as the first type of exposure meter is concerned, it requires a complex interlocking mechanism to move the pointer in interlocking relationship with the stop ring or the shutter dial. In the second type of exposure meter, the interlock mechanism may be a simple switch, but the number of indicating element is very large resulting in high cost and lack of space economy.

SUMMARY OF THE INVENTION

I contribute by my invention an exposure meter by which I am able to overcome the foregoing difficulties and disadvantages and to provide an exposure meter able to perform the two functions of the prior art mentioned above, but with a simple structure and using the minimum necessary number of the indicating elements.

There has thus been outlined, rather broadly, the more important features of the invention in order that the detailed description thereof that follows may be better understood, and in order that the present contribution to the art may be better appreciated.

There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important therefore that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings, forming a part of the specification, wherein.

DESCRIPTION OF THE PREFERRED EMBODIMENTS

Figure 1:
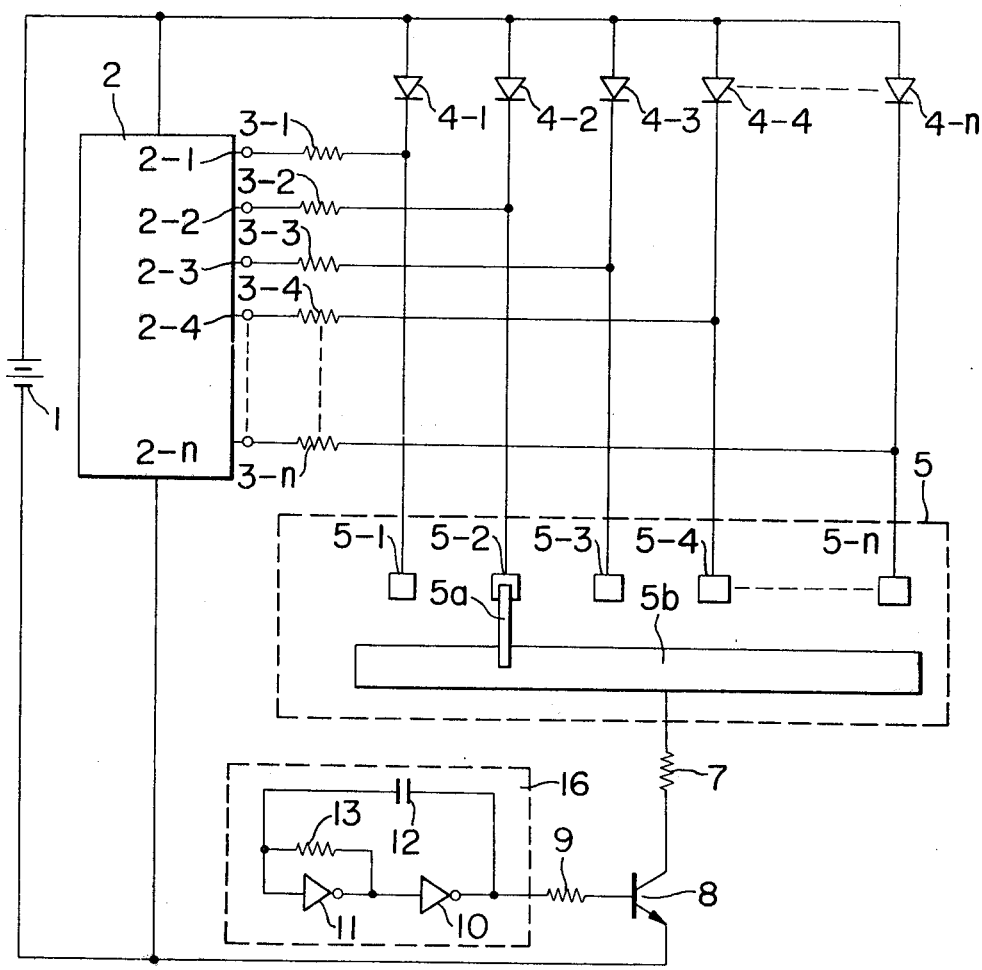
FIG. 1 shows a circuit diagram of an embodiment of the present invention.
Figure 2:
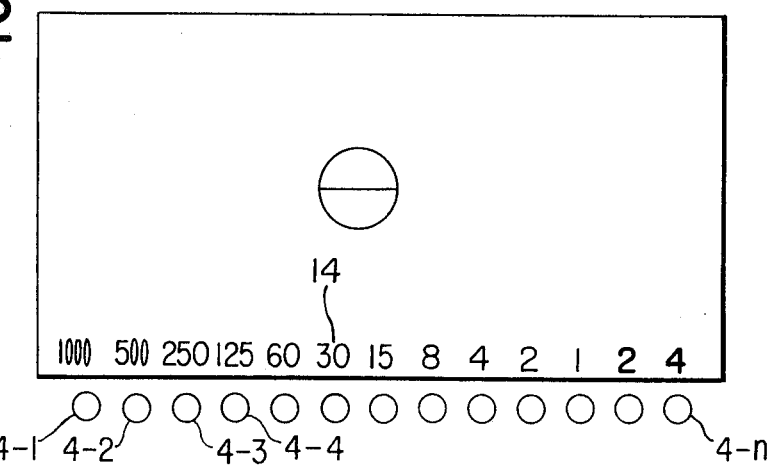
FIG. 2 shows an arrangement of the indicating elements in the finder of the camera.

In FIG. 1, which shows a circuit diagram of one embodiment of the invention, the photometry circuit 2 includes a photoelectric element (not shown) and calculates a proper exposure on the basis of the brightness of the external field, a preset stop value and a film sensitivity and makes selectively conductive one output terminal on $n$ number output terminals 2-1, 2-2, 2-3, 2-4 . . . 2-$n$ corresponding to the calculated shutter speed. The light illuminating diodes 4-1, 4-2, 4-3, 4-4 . . . 4-$n$ are arranged facing the shutter speed scale 14 at lower side of the field of the finder, as shown in FIG. 2, and anode terminals of the diodes are commonly connected to the positive terminal of the electric source battery 1, while the cathode terminals thereof are connected to the corresponding output terminals 2-1, 2-2 . . . 2-$n$ through corresponding protective resistors 3-1, 3-2 . . . 3-$n$. A changeover switch 5 consists of a brush 5a, collective element 5b, and taps 5-1, 5-2 . . . 5-$n$, the brush 5a moving in interlocking relationship with the shutter dial of the camera, so that one of the taps 5-1, 5-2 . . . 5-$n$, corresponding to the set shutter speed is selected to be connected to the collective element 5b. Such tap is connected to the junction of the cathode of a corresponding illuminating diode and its corresponding protective resistor. For example, the tap 5-1 is connected to the junction of the cathode of the diode 4-1 and the protective resistor 3-1. The collective element 5b is connected to the collector of the transistor 8 through the resistor 7. The emitter of the transistor 8 is connected to the negative terminal of the battery 1, and the base thereof is connected through a resistor 9 to the output terminal of an astable multivibrator producing a pulse signal of a definite period and consisting of inverters 10 and 11, resistor 13 and condenser 12 connected as shown.

According to the above described structure, when the camera is directed toward an object to be photographed after presetting the stop value of the lens and the sensitivity of the film, the photometry circuit 2 will turn on the illuminating diode corresponding to the proper shutter speed in response to the brightness of the object. If 1/125 second is the shutter speed for a proper exposure value, only the output terminal 2-4 of the photometry circuit 2 becomes conductive so that the illuminating diode 4-4 is turned on. Then the shutter dial is rotated to set the shutter speed to 1/500 second, the brush 5a of the switch 5 connects the tap 5-2 with the collective element 5b. Since the astable multivibrator consisting of the inverters 10 and 11 and the resistor 13 produces pulses of the definite period, the transistor 8 repeats ON and OFF with the same period. Consequently, the pulse current having the same period flows into the illuminating diode 4-2 through the resistor 7 and the switch 5, so that the diode 4-2 will be turned on and off to indicate in the finder the shutter speed being set by the shutter dial. In this instance, in the finder, the diode 4-4 is turned on and the diode 4-2 repeats on and off. By this means, the photographer can see that the shutter speed necessary to obtain the proper exposure value is 1/125 second and the presently set shutter is 1/500 second. Therefore, when the shutter speed dial is rotated to change the shutter speed from 1/500 second to 1/125 second, the brush 5a of the switch 5 will connect the tap 5-4 to the collective element 5b. At this time, the current flowing through the illuminating diode 4-4 is the current determined by the resistance of the protective resistor 3-4 and in addition to this current, the pulse current flowing therethrough via the resistor 7 due ot the transistor is overlapped. Therefore, in the finder, the diode 4-4 will be alternately turned on with the two intensities of brightness, respectively, one of which corresponds to the current determined by the protective resistor 3-4 and the other of which corresponds to the current determined by the resistor 7 in addition to the current due to the protective resistor 3-4. Thus, the photographer can verify that the shutter speed for obtaining the proper exposure indicated by the photometry circuit 2 coincides with the shutter speed being set by the shutter dial and this shutter speed is 1/125 second, which shows that the shutter speed set by the shutter dial is that giving the proper exposure.

Figure 3:
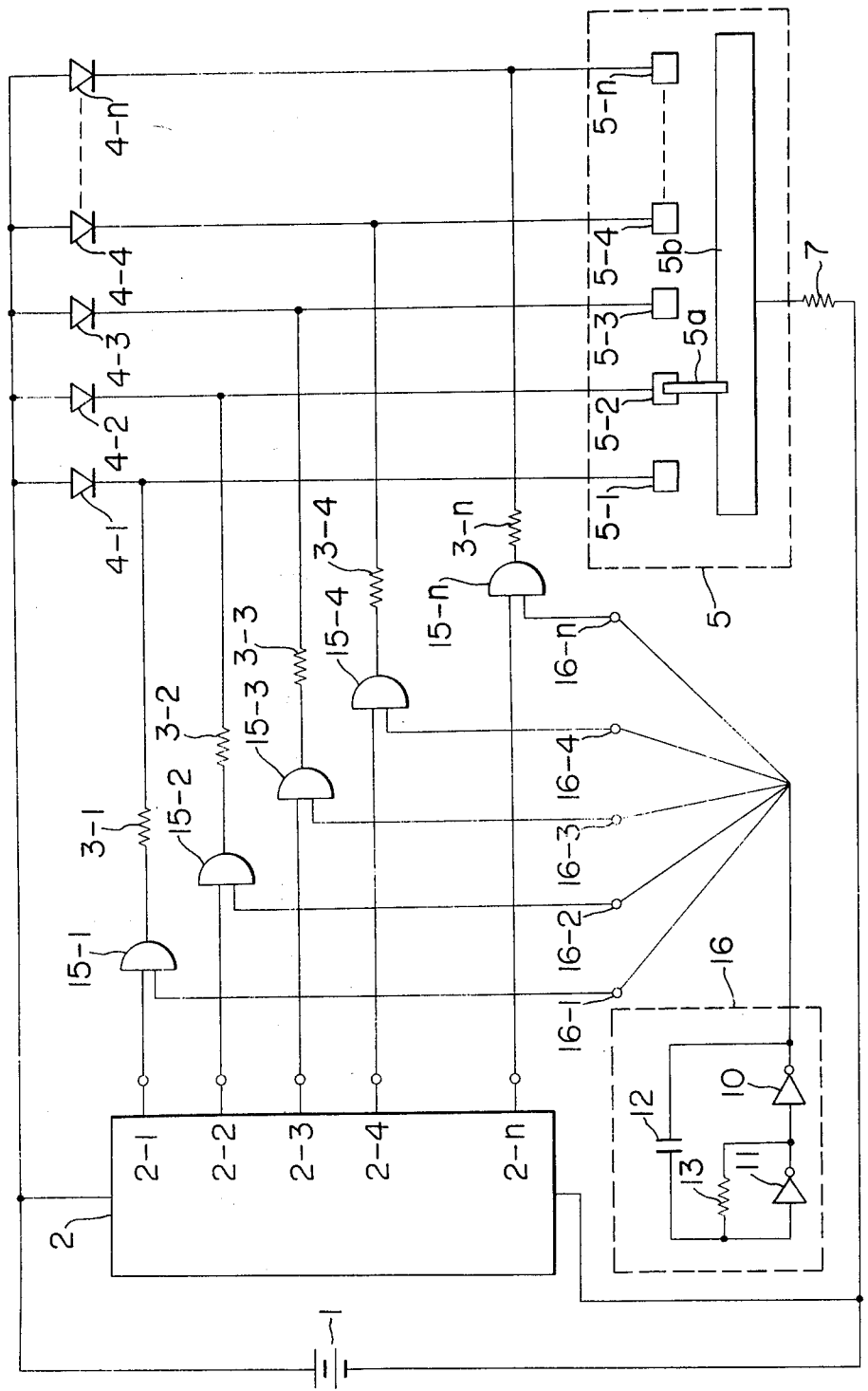
FIG. 3 shows a circuit diagram of a second embodiment of the invention.

The second embodiment will be explained with reference to FIG. 3. In the first embodiment shown in FIG. 1, the illuminating diode is turned on by the output of the photometry circuit 2, and is turned on and off by the output signal from the switch 5. In the second embodiment, the structure is reversely designed so that the diode is turned on by the output signal from the switch 5 and is turned on and off by the output of the photometry circuit. In FIG. 3, one of the input terminals of AND gate circuit 15-1, 15-2 . . . 15-n is connected to one of the output terminals 2-1, 2-2 . . . 2-n, and the other input terminal thereof is connected to one of the output terminals 16-1, 16-2 . . . 16-n of the pulse generating circuit 16, and the output terminal of the AND gate circuits is connected to one of the protective resistors 3-1, 3-2 . . . 3-n. The collective element 5b of the switch 5 is connected to the negative pole of the battery 1 through the resistor 7.

By this arrangement, only the AND gate circuit connected to the conductive output terminal of the photometry circuit 2 is operated and the illuminating diode connected to this AND gate through the protective resistor will turn on and off; and the terminal of the switch 5 corresponding to the manually set shutter speed is connected to the negative pole of the source 1 so that only the diode connected to this terminal will turn on.

In FIG. 2, the illuminating diodes are arranged facing the shutter speed scale 14. However, it is possible to overlap the diodes on the scale plate so that the scale plate can be seen by illuminating the diodes.

Further, in the above described embodiments the diodes indicate the shutter speed, but it is also possible to use diodes to indicate the stop value set by the stop ring and the stop value to obtain the proper exposure, or to use diodes to indicate the combination of the stop value and the shutter speed in case of a program shutter.

In case the camera has an automatic exposure control device and is provided with a switching device for enabling a manual set, the lighting of the illuminating diode will indicate the proper exposure stop value or the shutter speed when the exposure is automatically controlled, and the on and off operation of the diode will indicate the shutter speed or the stop value set manually when the exposure is switched to manual operation; and this will also indicate whether the exposure is automatically controlled or manually controlled.

As explained in the foregoing description, according to this invention, I contribute a simple structure using a minimum number of necessary indicating elements, the preset shutter speed or the stop value is indicated in the finder and the pointer-follow up function is performed. Moreover, by the use of illuminating diodes as the indicating elements, I provide strong resistance against mechanical shock, and the overall reliability of my exposure meter is greatly improved.

I believed that the construction and operation of my novel exposure meter will now be understood, and that the advantages thereof will be fully appreciated by those persons skilled in the art.

I claim:

1. Exposure meter for camera comprising:
    indicating means including a plurality of indicating elements, each of which indicates shutter time or stop value in the operative condition thereof;
    photometric means for causing one of said indicating elements to be operative to indicate at least one exposure factor in correspondence with the intensity of light from an object to be photographed and with manually set exposure factors;
    changeover means causing one of said indicating elements to be operative in correspondence with the manual setting of an exposure factor other than said exposure factors set in the photometric means; and
    a power source connected with said indicating means, said photometric means and said changeover means.

2. Exposure meter according to claim 1, wherein as exposure factors, stop value and a film speed are set into the photometric means;
    said indicating elements indicate shutter time, and said changeover means causes one of said indicating elements to be operative corresponding to the setting of a shutter time.

3. Exposure meter according to claim 11, wherein as exposure factors, shutter time and a film speed are set into the photometric means;
    said indicating elements indicate stop value, and said changeover means causes one of said indicating elements to be operative corresponding to the setting of a stop value.

4. Exposure meter according to claim 1, wherein said photometric means include the same number of output terminals as said indicating elements and generate a signal from one of the output terminals corresponding to said intensity of light and the manually set exposure factors, and each of said indicating elements are connected with said power source and each of said output terminals such that one indicating element becomes operative when it receives said signal from said photometric means.

5. Exposure meter according to claim 1, wherein said changeover means comprises a plurality of contacts, each of which is connected with each of said indicating elements, an electrically conductive element connected with a negative pole of the power source and a brush which is moved in accordance with said setting operation of the exposure factor to connect one of the contacts with the conductive element to cause one indicating element connected with said one contacts to be operative.

6. Exposure meter according to claim 1, further comprising means for electrically and intermittently connecting the negative pole of the power source and said changeover means intermittently to operate one of said indicating elements.

7. Exposure meter according to claim 6, wherein said electrically and intermittently connecting means includes an astable multivibrator which produces a pulse signal of a definite period.

8. Exposure meter according to claim 5, further comprising means for electrically and intermittently connecting the negative pole of the power source and the conductive element intermittently to operate one of the indicating elements.

9. Exposure meter according to claim 8, wherein said electrically and intermittently connecting means include an astable multivibrator which produces a pulse signal of a definite period.

10. Exposure meter according to claim 9, wherein said electrically and intermittently connecting means further includes a transistor whose collector is connected with said conductive element, whose base is connected with the output terminal of the astable multivibrator, and whose emitter is connected with said negative pole of the power source.

11. Exposure meter according to claim 1, further comprising means for electrically and intermittently connecting each of the output terminals of said photometric means and each of the indicating elements intermittently to operate one of the indicating elements.

12. Exposure meter according to claim 11, wherein said electrically and intermittently connecting means comprises a multivibrator which produces a pulse signal of a definite period and AND gate circuits, each output terminal of the AND gate circuit being connected with a respective indicating element, each input terminal of the AND gate circuit being connected to a respective output terminal of the photometric means, and the other input terminal of the AND gate circuit being connected with a respective output terminal of the multivibrator.

13. Exposure meter according to claim 1, wherein each indicating element is a light emitting diode.

14. Exposure meter for camera comprising:
  indicating means including a plurality of indicating elements, each of which indicates shutter time or stop value in the operative condition thereof;
  photometric means for causing one of said indicating elements to be operative in an on and off mode to indicate at least one exposure factor in correspondence with the intensity of light from an object to be photographed and with manually set exposure factors;
  changeover means causing one of said indicating elements other than said first mensioned one of said indicating elements to be operative in correspondence with the manual setting of an exposure factor other than said exposure factors set in the photometric means when said exposure factor is incorrect and causing said one of said indicating elements to be operative during said off indication when said exposure factor is correct;
  and a power source connected with said indicating means, said photometric means and said changeover means.

* * * * *

UNITED STATES PATENT AND TRADEMARK OFFICE
CERTIFICATE OF CORRECTION

PATENT NO. : 4,043,677
DATED : August 23, 1977
INVENTOR(S) : KENJI TOYODA

It is certified that error appears in the above-identified patent and that said Letters Patent are hereby corrected as shown below:

Column 4, line 56, change "claim 11" to -- claim 1 --.

Signed and Sealed this

Fourteenth Day of February 1978

[SEAL]

Attest:

RUTH C. MASON
*Attesting Officer*

LUTRELLE F. PARKER
*Acting Commissioner of Patents and Trademarks*